Dec. 15, 1925.  
T. O. BROOKS  
TOASTING OVEN  
Filed June 19, 1923  
1,565,784
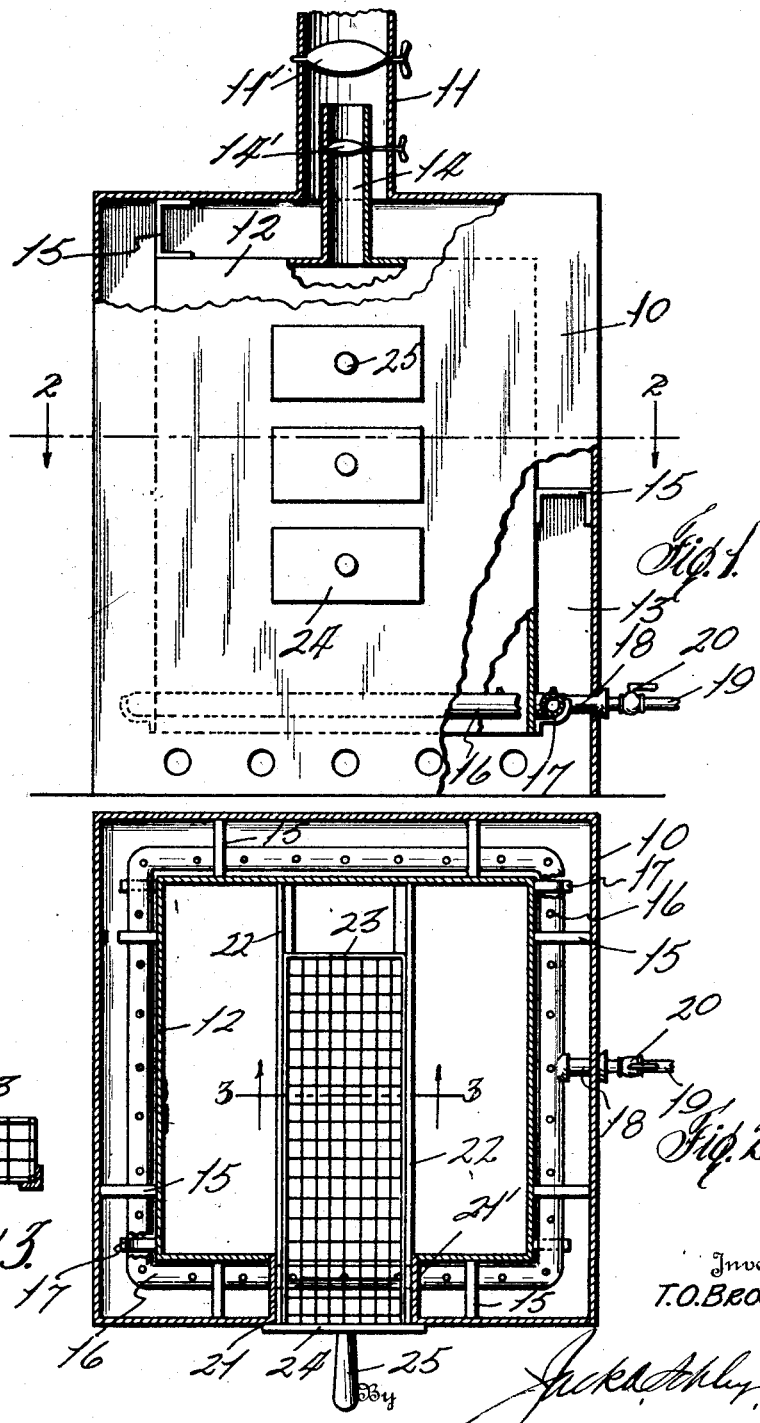
Inventor  
T. O. BROOKS Patented Dec. 15, 1925.

1,565,784

UNITED STATES PATENT OFFICE.

THOMAS O. BROOKS, OF DALLAS, TEXAS.

TOASTING OVEN.

Application filed June 19, 1923. Serial No. 646,314.

*To all whom it may concern:*

Be it known that I, THOMAS O. BROOKS, a citizen of the United States of America, residing at Dallas, in the county of Dallas and State of Texas, have invented certain new and useful Improvements in Toasting Ovens, of which the following is a specification.

This invention relates to new and useful improvements in toasting ovens.

The object of the invention is to provide an oven in which the articles are subjected to an indirect heat and are spaced from the heating walls.

A particular object is to provide foraminous supports for the bread, rolls, or other objects located in the center of a compartment and spaced from the walls thereof, whereby the bread, rolls, etc., are evenly toasted without being subjected directly to the flame or to intense heat at close range.

A further object is to obviate a flame in the toasting support and to entirely segregate the flames and the fumes thereof, from the toasting chamber.

A still further object is to provide quickly and easily removed trays for toasting which make for fast service.

A construction designed to carry out the invention will be hereinafter described, together with other features of the invention.

The invention will be more readily understood from a reading of the following specification and by reference to the accompanying drawings, in which an example of the invention is shown, and wherein:

Fig. 1 is a front elevation of an oven constructed in accordance with my invention, portions of the walls being in section, Fig. 2 is a horizontal cross-sectional view taken on the line 2—2 of Fig. 1, and Fig. 3 is a sectional view on the line 3—3 of Fig. 2.

In the drawings the numeral 10 designates a cubical outer shell having a central flue 11. Within the shell 10 is disposed an inner cubical shell 12 of smaller diameter, whereby a rectangular heating space 13 is formed between the shells. The inner shell has a flue 14 extending up into the flue 11, but smaller so as to provide a space therebetween. A damper 11′ is arranged in the flue 11 above the flue 14. A damper 14′ mounted in the flue 14 has its handle extending through the flue 11, thus both dampers may be controlled as described.

The inner shell is supported above the bottom of the outer shell and held in place by brackets 15. A rectangular gas burner 16 surrounds the lower end of the inner shell and is mounted in the space 13 on hangers 17 carried on the outside of the inner shell. An air mixing tube 18 extends through the outer shell and is connected with the burner. A gas supply pipe 19 enters the tube and includes a cock 20.

The outer shell may have a covering of asbestos or other heat insulating means and may be suitably finished and ornamented. A plurality of superposed openings 21 are cut in the front wall of the outer shell 10 and collars 21′ contiguous to said openings extend from the inner shell across the flue 13 to said openings. Tracks 22 angular in cross-section extend from the openings 21 through the collars to the rear wall of the shell 12, to which they are fastened.

Elongated foraminous trays or drawers 23 preferably formed of coarse mesh wire fabric are of such size as to slide upon each pair of tracks, (Fig. 3). The front of each tray is attached to a vertical closure and shield plate 24, larger in area than the opening, whereby it overlaps the four sides of said opening and closes the same. These may be lined and covered if desired, with asbestos or other heat insulation. The trays are of such length as to terminate short of the rear wall of the inner shell, when closed. To the outer side of each plate is attached a handle 25.

It will be seen that the trays are spaced a sizeable distance from the side and rear walls of the inner shell. The flame of the burner rises in the space 13 and can not enter the inner shell, neither can the fumes. The heat escaping from the space 13 is controlled by the damper 11′, while the escape of heat from the inner shell is regulated by the damper 14′.

In using the oven the burner is lighted and the shells permitted to heat. The inner shell will gradually become warm and will be filled with hot air. A tray 23 is removed and the bread or sliced rolls, etc., are placed thereon and the tray closed. The tray being in the center of the inner shell, is far removed from the flame and the bread thereon will be subjected to an indirect heat, there being no source of heat directly under the tray. The bread will first be dried out, particularly on its outer surface and then will be gradually toasted. With the heat properly regulated the bread will be quickly toasted and a crisp tasty article of food produced, which will be much more pleasing to the palate than toast made in direct contact with a flame. Further, a more evenly toasted slice will be had and burning will be less likely.

Various changes in the size and shape of the different parts as well as modifications and alterations may be made within the scope of the appended claims.

What I claim is:

1. In an oven, an outer shell, an open bottom inner shell having a top vent and disposed within the outer shell spaced therefrom, a burner in the space between the shells comprising the sole heating means therefor, whereby the inner shell is free from flames and fumes of the burner, and means for supporting articles of food spaced from the side walls of the inner shell for toasting.

2. In an oven, a cubical outer shell, a cubical inner shell within the outer shell and spaced therefrom, a burner in the space between the shells constituting the sole heating means therefor, tracks extending from the front to the rear wall of the shell and spaced from the sides thereof, and a foraminous tray supported by said tracks and normally spaced from the side and rear walls of the inner shell.

3. In an oven a cubical outer shell, a cubical inner shell, having an air inlet at its bottom and a vent at its top and disposed within the outer shell and spaced therefrom, a burner in the space between the shells, comprising the sole heating means for the oven, openings in the front wall of the outer shell, collars on the inner shell extending therefrom to the openings, trays spaced from the side and rear walls of the inner shell, closure plates carried by the trays and covering said openings, and handles mounted on said plates.

In testimony whereof I affix my signature.

THOMAS O. BROOKS.